US007100823B2

(12) United States Patent
Miyaji

(10) Patent No.: US 7,100,823 B2
(45) Date of Patent: Sep. 5, 2006

(54) COIN SELECTOR WITH A SMART CARD CHARGING FUNCTION

(75) Inventor: Masaru Miyaji, Iwatsuki (JP)

(73) Assignee: Asahi Seiko Kabushiki Kaisha, (JP)

( * ) Notice: Subject to any disclaimer, the term of this patent is extended or adjusted under 35 U.S.C. 154(b) by 166 days.

(21) Appl. No.: 10/880,380

(22) Filed: Jun. 28, 2004

(65) Prior Publication Data

US 2004/0262382 A1 Dec. 30, 2004

(30) Foreign Application Priority Data

Jun. 30, 2003 (JP) ............................ 2003-188852

(51) Int. Cl.
*G06F 7/08* (2006.01)

(52) U.S. Cl. ...................................................... 235/381

(58) Field of Classification Search ................ 235/381; 379/91.01, 93.22, 114.19, 144.01, 144.04; 194/335; 700/232
See application file for complete search history.

(56) References Cited

U.S. PATENT DOCUMENTS 6,021,884 A 2/2000 Tsuchida
6,296,182 B1 * 10/2001 Ota et al. ................... 235/379
6,424,884 B1 * 7/2002 Brooke et al. .............. 700/232
2003/0195037 A1 * 10/2003 Vuong et al. ................. 463/29

FOREIGN PATENT DOCUMENTS

| | | |
|---|---|---|
| JP | 63-29308 | 11/1994 |
| JP | 2001-126121 | 5/2001 |
| JP | 20-0174519 | 9/2002 |

* cited by examiner

*Primary Examiner*—Jared J. Fureman
*Assistant Examiner*—Kristy A. Haupt
(74) *Attorney, Agent, or Firm*—McGlew & Tuttle, PC

(57) ABSTRACT

A coin selector is provided with a charging function for smart cards and coins. A coin selector is provided with a smart card charging function comprising of a coin slot which is located at the upper section of a perpendicular base plate and a coin returning slot which is located below the coin slot at the base plate. An upwards slanting surface which faces the upper section of said base plate has a coin entry which is located at the upwards slanting surface. An antenna or sensor for communicating or signaling is located around the coin entry and under the upwards slanting surface. An antenna signal indicator is located on the upwards slanting surface.

15 Claims, 5 Drawing Sheets

COIN SELECTOR WITH A SMART CARD CHARGING FUNCTION

CROSS REFERENCE TO RELATED APPLICATIONS

This application claims the benefit of priority under 35 U.S.C. § 119 of Japan Application No 2003-188852 filed Jun. 30, 2003, the entire contents of which is incorporated herein by reference.

FIELD OF THE INVENTION

This invention relates to a coin selector with a smart card charging function. The invention especially relates to a coin selector with a charging function for use with genuine coins and with smart cards having a memory for memorizing the money information. In this specification, "coin" is a generic name referring for example to tokens, medals or a similar disk type medium. "Charging apparatus" is a generic name referring to a device which supplies a predetermined service based on a received value medium: for example vending machines and automatic photo machines, gaming machines, etc. "Value information" is a generic name referring for example to money information or a point system which can be changed to money or merchandise etc.

BACKGROUND OF THE INVENTION

It is known in the prior art (Japanese Patent Publication number 29308 of 1988 (see FIG. 1-5)) that a coin selector may include a coin slot, a mechanical coin selecting section for authenticating coins which is located continuously to the coin slot and is located along a coin passageway and with an outputting section which outputs a genuine signal to a charging apparatus. In recent years, the information apparatus known as a smart card has been developed and used. Such smart cards have an IC which memorizes some value information.

Also the smart cards are used for settling finances. In other words, the settling of debts/charges is accomplished with the use of coins and/or smart cards. Therefore a charging apparatus is needed that can be used to process coins and/or smart cards.

The first known prior reference (Korean Utility Model number 174519 (see FIG. 3)) for answering this need includes features with the charging apparatus having a coin selector and a reading and writing unit for a contact type smart card.

Also, an additional prior reference (Japanese Publication of unexamined Patent application number 2126121 (see FIGS. 1, 2, 4, 5, pages 3–4)) is known where a slot of a reading and writing unit is located below the banknote slot of a validator.

In Japanese Patent Publication number 29308, a customer has to insert the smart card into the slot every time. This procedure is a lot of bother. Also, when the coin selector and the reading/writing unit for the smart card are independently detached from the charging apparatus, there is a possibility where a customer might get confused as they feel that they can only use one medium or the other: for example the smart card or the coin, but not both. Furthermore the charging apparatus becomes larger in employing a device of Japanese Patent Publication number 29308.

In Korean Utility Model number 174519, when the charging apparatus is larger than the banknote size, for use as a banknote validator, the reading/writing unit can be attached easily. However when the width of the charging apparatus is smaller than the banknote, as it is with the coin selector, the reading/writing unit can not be attached.

SUMMARY OF THE INVENTION

An object of the present invention is to provide a coin selector with a charging function for smart cards and coins.

It is another object of the invention to provide a miniaturized coin selector with a charging function for smart cards and coins.

It is still another object of the invention to provide a coin selector with a charging function for smart cards and coins where the coin selector can be converted to an existing coin selector easily.

According to the invention a coin selector with a smart card charging function is provided with a coin slot which is located at the upper section of a perpendicular base plate, and a coin returning slot which is located below said coin slot at said base plate. An upwards slanting surface is provided facing the upper section of said base plate. A coin entry is located at the upwards slanting surface. An antenna is provided for communicating/sensing. The antenna is located around the coin entry and under the upwards slanting surface. An antenna indication means or antenna indicator is located on the upwards slanting surface.

In this structure, the upwards slanting surface faces toward the upper section of the base plate. A space is provided at a location below the upwards slanting surface. The antenna for communicating to the smart card may be located at this space.

Accordingly, the antenna for communicating/sensing is located under the upwards slanting surface which is around the coin slot, also the antenna indication is located at the upwards slanting surface.

When a customer inserts a coin into the coin slot, the customer can see the antenna indication on the upwards slanting surface. Then the customer understands where a smart card can be used. Also when the customer uses a smart card, the customer can see the coin slot. Therefore the customer understands where a coin can be used. Also, the coin slot and the antenna are located at the same place or adjacent each other as to the upwards slanting surface. Accordingly, the unit can be miniaturized, also the coin entry is easier and also the scanning of the smart card is easier as it is closer to the antenna.

According to another aspect of the invention a coin selector is provided with a smart card charging function with a coin selecting section which includes a mechanical selecting section which is located at perpendicular plate and a base plate which is made up of metal and is disposed crossing the perpendicular plate at a right angle. The base plate includes a coin slot at the upper section and a returning slot at the lower section. An upwards slanting surface is made from a nonmagnetic material and is fixed at said base plate. An antenna attachment means or attachment part, which includes a guiding passageway, is connected to the coin entry. A front cover, which is made from a nonmagnetic material, includes a coin slot and connects to said guiding passageway and said coin returning slot which connects to said returning slot and which is fixed at said base plate.

In this structure, the coin selecting section includes the mechanically selecting section and is attached at the perpendicular plate and the base plate which is made from a metal. The base plate is attached at the perpendicular plate at a right angle. The base plate includes the coin receiving slot at the upper section and the coin returning slot at the lower section.

The coin selecting section and the base plate can be provided employing normal known or usual parts such as is known from U.S. Pat. No. 6,021,884, which is hereby incorporated by reference. The antenna attachment means may be fixed at the base plate and is made from a nonmagnetic material and includes the upwards slanting surface and the guiding passageway which continues to the coin entry.

The front cover is made from a nonmagnetic material and includes the coin slot which continues to the guiding passageway and the coin returning slot which continues to the coin returning section and is fixed at the base plate. The antenna attachment and the front cover present new features as provide and particularly in combination as shown and described. As such, a part of the coin selector is made up by the existing coin selecting section. As a result, the coin selector with the charging function for smart card is inexpensive to implement. Also, the coin selecting section of the existing coin selector is used, and this is adapted to provide the improvement using a novel antenna attachment and front cover in combination. Accordingly, an existing coin selector can be altered to the coin selector with the smart card charging function. As a result, the existing coin selector can be altered to the coin selector with the smart card charging function and this may be done in an inexpensive manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention is illustrated.

DESCRIPTION OF THE PREFERRED EMBODIMENT

Figure 1:
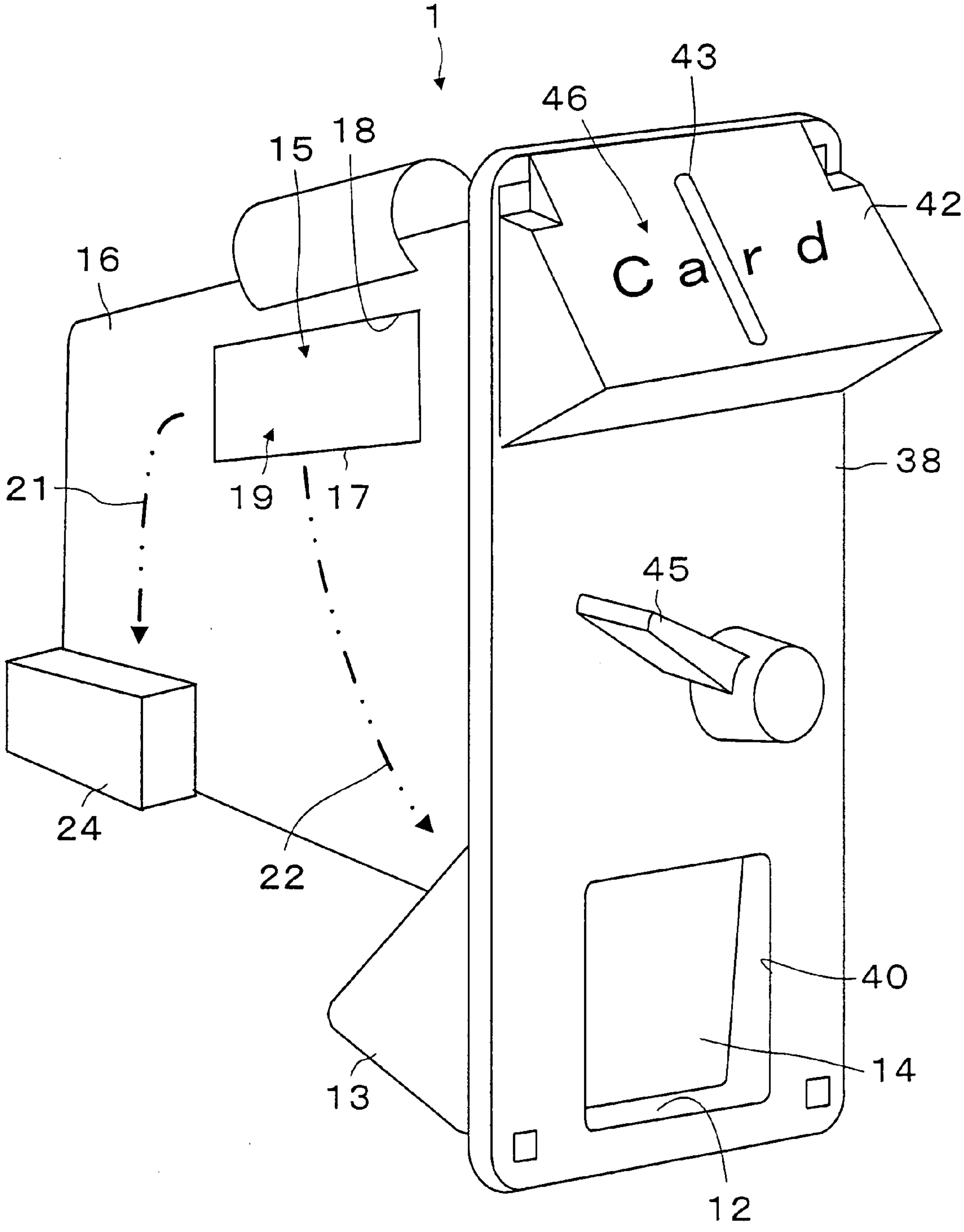
FIG. 1 is a perspective view of the coin selector with the smart card charging function, according to a first embodiment of the invention.

Referring to the drawings in particular, firstly, a coin selector 1 is explained. The base plate 10 is a rectangular metal plate, upstanding relative to horizontal (perpendicular). The base plate 10 has a coin slot 11 that is rectangular and is located at the upper section of the base plate 10. A returning slot 12 is located at the lower section of the base plate 10. A storing box 13 is fixed at the rear of the returning slot 12. Coins that are returned can lie in the returning slot 12.

The returning slot 12 is covered with a lid 14 which can pivot on the inside of storing box 13. However, the lid 14 can be moved (pivoted) by a customer if he/she wishes to retrieve their money. A selecting plate (perpendicular support plate) 16 is provided that includes a coin selecting section 15 and is attached at the rear of the base plate 10 at a right angle.

The coin selecting section 15 is shown schematically including a guiding rail 17 which slants downwards and gage rail 18 which is located parallel to the guiding rail 17. A genuine coin is guided by gage rail 18, however smaller coins are not guided by gage rail 18. Accordingly, the smaller coins are not guided by gage rail 18, and fall down from opening 19. In this embodiment, the coin selecting section 15 is mechanical but it may be of any of various known types. A genuine coin which is distinguished by the coin selecting section 15 will pass through the genuine coin passageway 21. It is then stored in a safe (not shown). The false coins are returned to storing box 13 through a false coin passageway indicated schematically at 22.

The coin selecting section 15 can be changed to another unit which includes a function which distinguishes authenticity. For example, a magnet is located downstream of the coin selecting section 15. When false coins are used which are made from an iron material, with the coin having the same diameter and thickness, it is adsorbed or acted on by the magnet for treatment as false. Also the coin selector 15 is not limited in mechanically, for example: an electrical coin selector with oscillating coils may be used, and the data of the material and the diameter of the coin may be detected, afterwards the authenticity may be distinguished based on the data.

Figure 2:
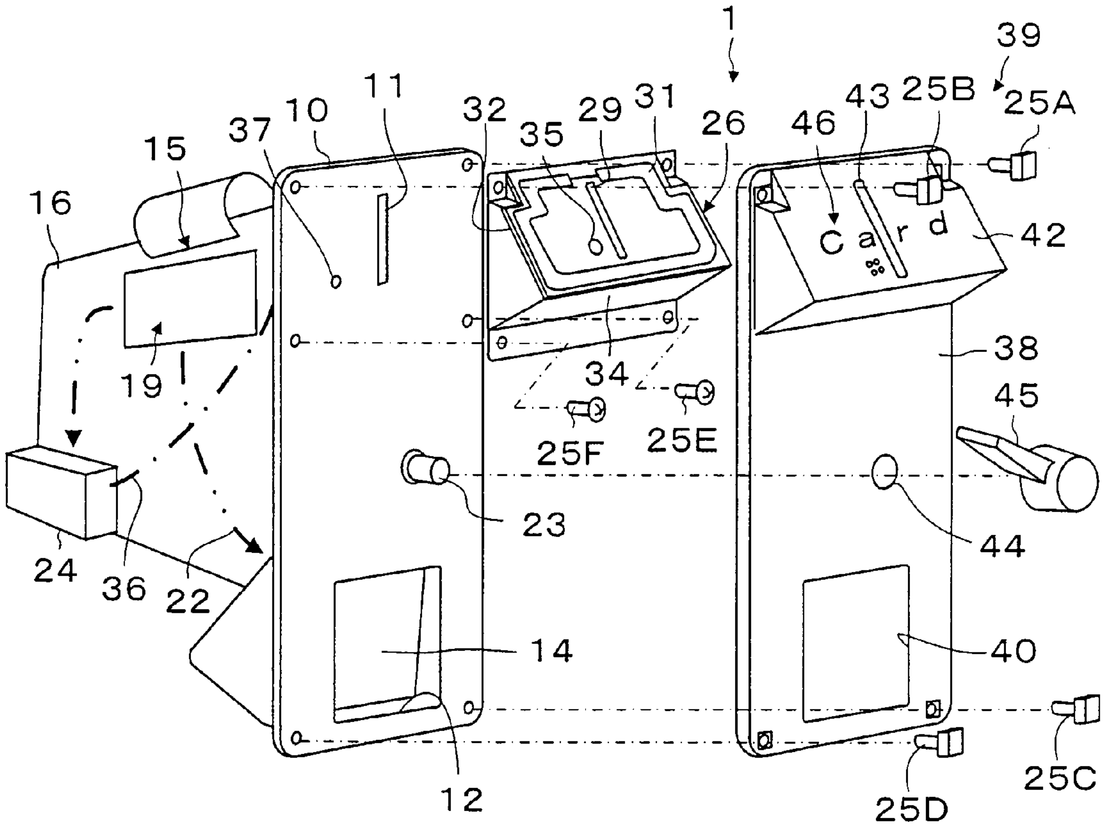
FIG. 2 is an exploded perspective view of the coin selector with, the smart card charging function, of the first embodiment.

A shaft 23 projects into the middle of the base plate 10 (see FIG. 2). The shaft 23 is an operating shaft for returning the coin adsorbed or acted on by the magnet or a jammed coin in the coin selecting section 15. A deposited falling coin in the genuine coin passageway 21 is detected by a micro switch 24. A charging apparatus than goes over to a useable situation based on the detecting signal from micro switch 24. The base plate 10 is fixed at the perpendicular front surface of the charging apparatus by some rectangular head screws 24A, 25B, 25C, 25D together with a front cover 38 and an antenna attaching means in the form of antenna attachment 26 discussed below.

The attaching section of the charging apparatus is made from metal. The opening, which continues to a coin safe and disposes coins fed by the selecting unit 1, is covered with the base plate 10 which is made from metal. This is a preferred material so that stealing is prevented.

Next, the antenna attachment 26 is explained. The antenna attachment 26 is made from a nonmagnetic material and is a prism or similar shape (substantially a triangle or quadrangle in cross section). The attacher 26 positioned lying against the base plate 10 is fixed at the base plate 10 at corners by screws 25A, 25B, 25E, 25F.

Figure 3:
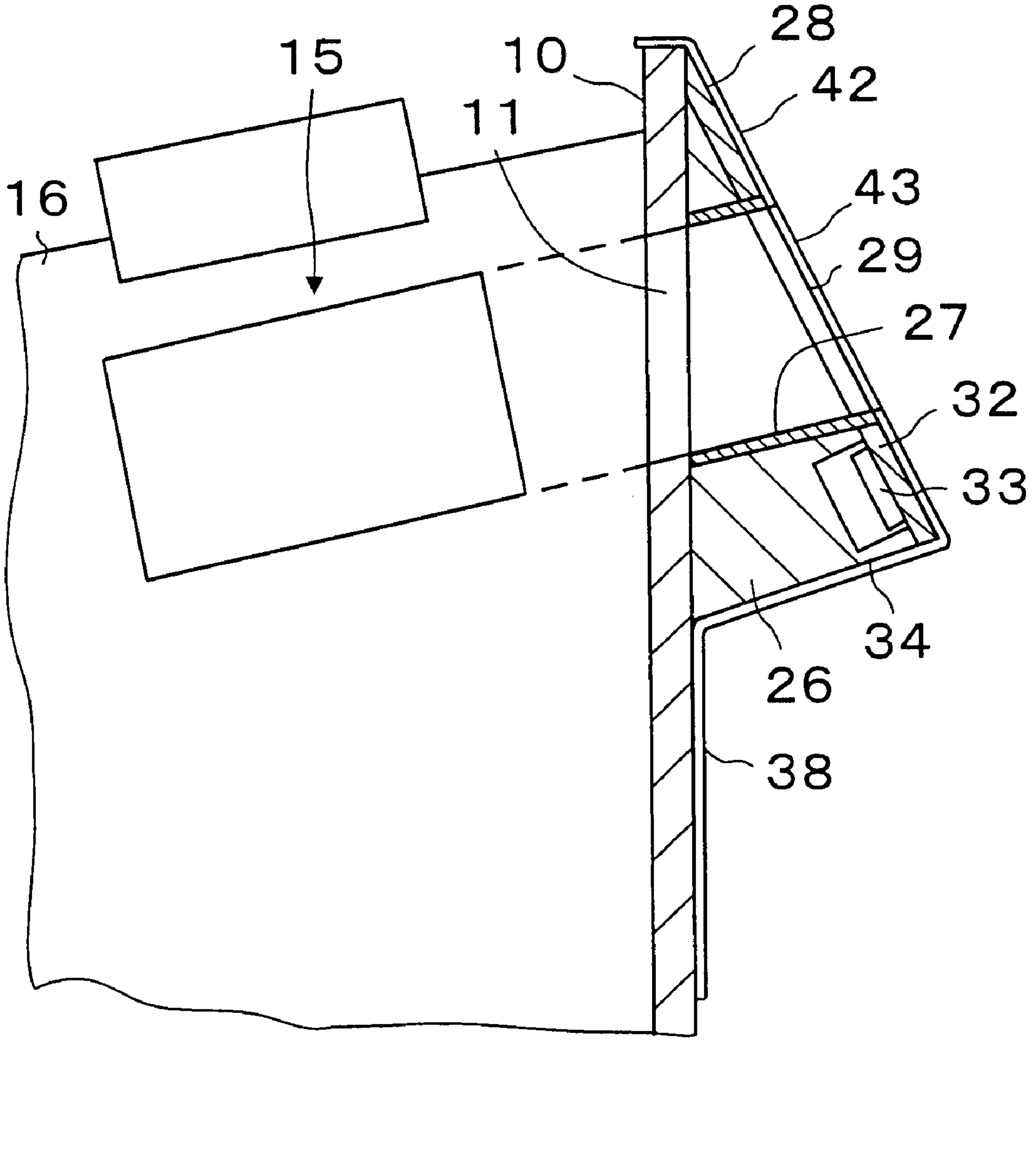
FIG. 3 is a cross-section view of the coin passageway of the coin selector, with the smart card charging function, of the first embodiment.

A coin passageway 27 slants downwards towards coin slot 11 and is located in the antenna attachment 26 as shown in FIG. 3. An entry 29 is located at upwards slanting surface 28. The coin passageway 27 is structured by a metal tube which is rectangular at a cross section and defines the inner surface of the passageway. The use of the tube prevents the wear of coin passageway 27. The metal tube is inserted into the antenna attachment 26. The outlet of coin passageway 27 faces to coin slot 11. The upwards slanting surface 28 is a plane which slants relative to the base plate 10 at approximately 30 degrees. In other words, the slanting surface 28 slants at approximately 60 degrees to the level or horizontal.

An antenna board 32 is fixed at slanting surface 28. The antenna board 32 is a flat element and includes printed circuit 33 for sending a charging signal to the micro switch 24, a communicating circuit and the antenna 31 for communicating to a smart card. The lower surface 34 which continues to slanting surface 28 of the antenna attachment 26 slants to the base plate 10 and includes a tier.

A speaker 35 is attached at antenna board 32. A through hole 37 is provided for a leading wire 36, which continues to the micro switch 24 and the circuit 33. The trough hole 37 is located at the base plate 10. The antenna attachment 26 and the base plate 10 are covered with a front cover 38.

The front cover 38 is rectangular and is made from a nonmagnetic material; for example resin. The front cover 38 includes charging section 39 which faces the antenna attachment 26 and protrudes forwards to a triangular shape at the upper section and a coin returning slot 40 which is aligned with the returning slot 12 of the base plate 10. The upper surface of charging section 39 is an upwardly slanting surface 42 and slants at the same angle as the antenna attachment 26. The coin entry 43 is rectangular and is located at the middle of front cover 38. The coin entry 43 faces the entry 29 of the antenna attachment 26.

An operating lever 45 is fixed at shaft 23 which protrudes from penetrated hole 44 which is located at the middle of front cover 38. When the operating lever 45 pivots in the clockwise direction as shown in FIG. 1, a false coin which jams at coin selecting section 15 is returned to a returning slot 12. An antenna indicator 46 for indicating a smart card is located at the upwardly slanting surface 42. The indicator 46 is combined with character and/or diagram that indicates directly the use of the smart card.

Figure 4:
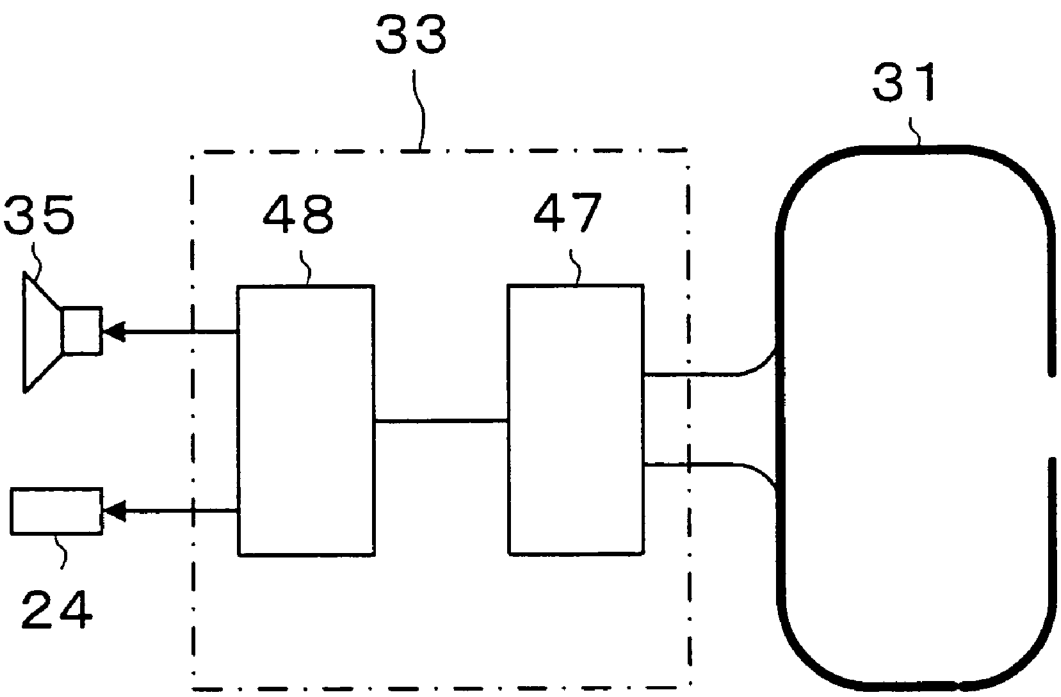
FIG. 4 is a controlling block diagram of the coin selector, with the smart card charging function, of the first embodiment.
Figure 5:
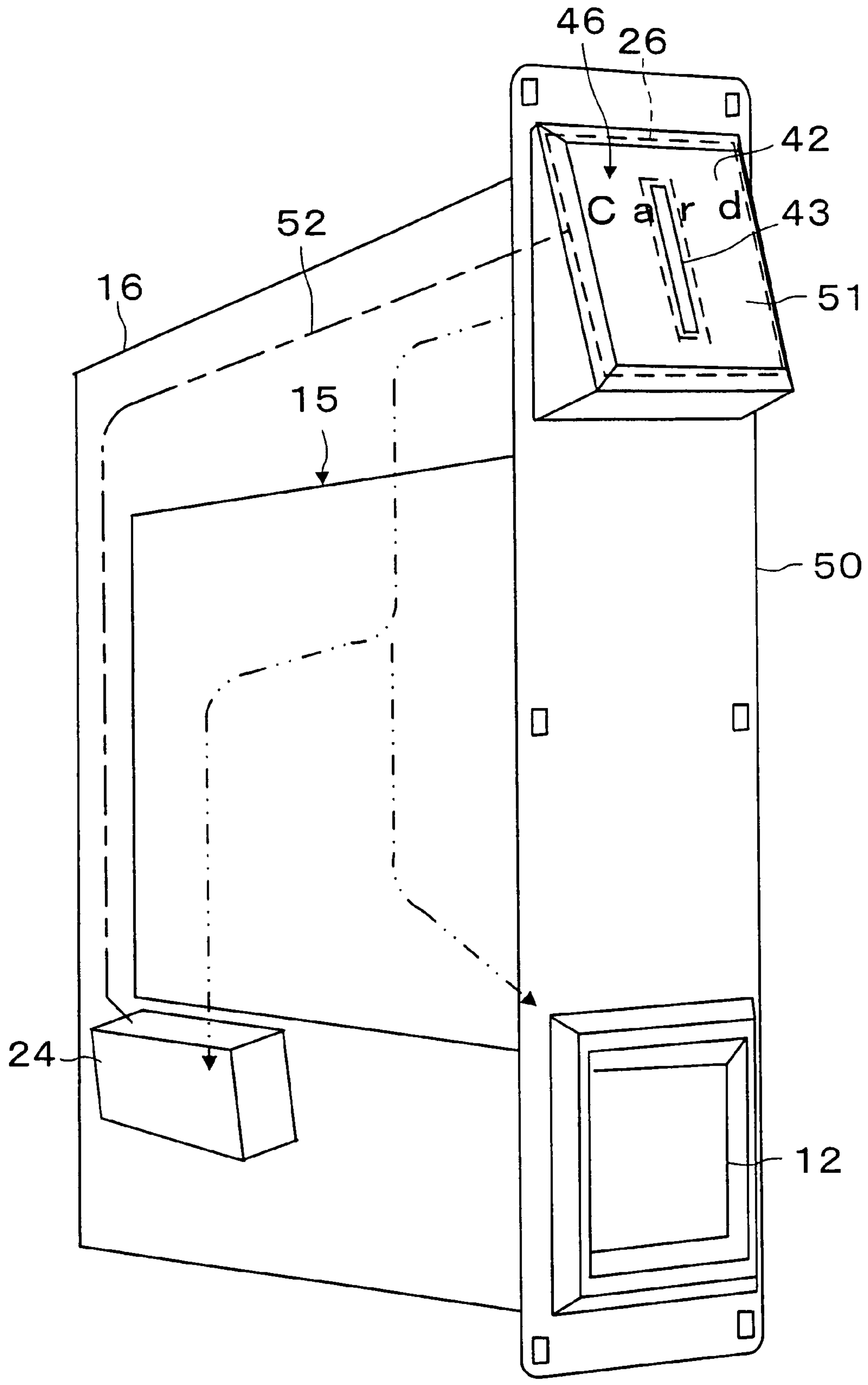
FIG. 5 is a perspective view of the coin selector, with the smart card charging function, according to a second embodiment of the invention.

The circuit 33 includes sending/receiving circuit 47 which connects to antenna 31 and charging circuit 48 as shown in FIG. 4. A charging circuit 48 outputs money information which reduces a charged fee from the reading money information to a sending/receiving circuit 47. Afterwards, the money information is memorized in the smart card.

The completion of the charging process is announced to the customer by a speaker 35. Furthermore, the charging signal is outputted to micro switch 24. Accordingly, the charging apparatus is goes into a useable situation useable state.

However the charging circuit 48 can be changed to a counter which counts the used number of times for the charging apparatus. In this case, when a customer leaves the hall, the counted number is multiplied to a fee, afterwards the fees are cleared up. The notice of completion of the charging process to the customer can be changed to a luminous body at upwards slanting surface 42.

In this structure, the inserted coins into coin entry 43 arrive at the coin selecting section 15 through the entry 29, the coin passageway 27 and the coin slot 11, afterwards it is distinguished. The genuine coin is detected by the micro switch 24, afterwards it is stored in the safe. When a smart card is utilized, the smart card is located near or has contact with the upwards slanting surface 42. Accordingly, antenna 31 communicates to the smart card. As a result, the gaming fee (or credit, amount, etc.) is reduced from the memorized money of the smart card.

When a coin selector of an existing charging apparatus is altered, the base plate 10 and plate 16 are the same parts which are retained for use. Through hole 37 is made up by a drill. The antenna attachment 26 and front cover 38 are newly made up, and are attached to the base plate 10. Accordingly, the alteration of the existing unit is easy. Also, a part of the existing charging apparatus is utilized. Therefore, the coin selector can be made up inexpensively. Furthermore, when the coin selector is newly made up, the base plate and the selecting plate 16 utilizes the existing parts. As a result, the coin selector can be made up inexpensively.

Next, a second embodiment is explained. The parts of the second embodiment are attached to the same symbol of the first embodiment and the related explanation is omitted. A base plate 50 is rectangular and is made from stainless steel. An entry section 51 is located at the upper section of the base plate 50 and is a trapezoid (or quadrangle or substantially trapezoid) and is built in to the antenna attachment 26. The unified screws at the reverse of the entry section 51 are penetrated into the base plate 50 and are screwed by nuts (not shown) to the screws from the reverse side, and are fixed. The base plate 50 is fixed at the frame of the charging apparatus by rectangular head screws as the same as first embodiment. The antenna attachment 26 is connected to the micro switch 24 by a lead wire 52 as the same as the first embodiment.

The front surface of the entry 51 slants upwards, and coin inserting slot 43 is located at the middle of the front surface. The coin passageway which continues to coin inserting slot 43 is structured about the same as the first embodiment. The coin selecting section 15 is for example that disclosed in Japanese un-examined patent application 53-72695. In this coin selecting section 15, the entry section 51 is changed to a type which is built in the antenna attachment 26. The alteration is easy to accomplish.

The antenna for communicating is located under the upwards slanting surface which is around the coin entry providing a significant advantage. Also the antenna indication is located at the upwards slanting surface. When a customer inserts a coin into the coin entry, the customer can see the antenna indication on the upwards slanting surface. Then the customer understands where the smart card can be used. Also when the customer uses a smart card, the customer can see the coin slot. Therefore the customer understands where a coin can be used. Also, the coin slot and the antenna are located at the same place of the upwards slanting surface. Accordingly, the unit can be miniaturized, also the coin investing is easier and the smart card can be attached or connected to the antenna. The existing coin selector can be altered to the coin selector with the smart card charging function. As a result, the existing coin selector can be altered to the coin selector with the smart card charging function in an inexpensive manner.

While specific embodiments of the invention have been shown and described in detail to illustrate the application of the principles of the invention, it will be understood that the invention may be embodied otherwise without departing from such principles.

10, 50 base plate
12 returning slot
15 coin selecting section
16 plate
26 antenna attachment part
27 guiding passageway
28 slanting surface
31 antenna
38 front cover
42 upwards slanting surface
43 coin inserting slot
46 antenna indicator

What is claimed is:

1. A coin selector with a smart card charging function, the coin selector comprising:

a selection plate;

a coin selecting section located at said selection plate;

a base plate crossing said selection plate substantially at a right angle thereto, said base plate comprising a coin slot at an upper section and a returning slot at a lower section;

an antenna attachment part comprising a guiding passageway connected to said coin slot and an upwards slanting surface, said upwards slanting surface having a coin entry slot, said antenna attachment part with slanting surface being fixed at said base plate;

a front cover, said front cover including a coin entry opening in registration with said guiding passageway and a coin returning slot opening in registration with said returning slot, said front cover being fixed relative to said base plate;

a loop antenna for communicating with a smart card, said antenna being located around said coin entry and recessed relative to said upwards slanting surface; and an antenna indicator located on said upwards slanting surface.

2. A coin selector according to claim 1, wherein said coin selecting section comprises a mechanical or non-mechanical selecting section located at said selection plate.

3. A coin selector according to claim 1, wherein said front cover is made from a nonmagnetic material.

4. A coin selector according to claim 1, wherein said base plate is made up of a metal material.

5. A coin selector according to claim 1, further comprising a storing box, said storing box located behind said returning slot, said storing box being in registration with said returning slot.

6. A coin selector according to claim 1, wherein said returning slot comprises a covering lid, said covering lid being in registration with said returning slot, said lid being attached to a pivot inside a storing box.

7. A coin selector according to claim 1, further comprising:

a guiding rail, said guiding rail slanting downwards;

a gage rail, said gage rail being parallel to said guiding rail;

a shaft, said shaft connected to said coin selecting section, said shaft protruding outward through a hole in said base plate, said shaft attached to an operating lever, said operating lever being in registration with said front cover;

a micro-switch;

an antenna board, said antenna board being attached to said upwards slanting surface;

a printed circuit, said printed circuit being mounted on said antenna board;

a speaker, said speaker being attached to said antenna board; and an antenna indicator, said antenna indicator located at said upwards slanting surface.

8. A coin selector according to claim 7, wherein said printed circuit comprises a sending/receiving circuit and a charging unit, said sending/receiving circuit being attached to said loop antenna.

9. A smart card charging function and coin selector product provided by the process comprising:

providing a support plate with a coin selecting section and a connected rigid base plate including a coin slot at an upper section and a returning slot at the a lower section;

providing an antenna and an antenna support part with a guiding passageway with the antenna positioned and supported by the antenna support part located around the guiding passageway, said guiding passageway located within said antenna support part;

connecting the antenna support part to the base plate with the guiding passageway in registration with the coin slot.

10. A coin selector according to claim 9, wherein a front cover made from a nonmagnetic material is disposed covering at least a portion of the antenna support part and said base plate with said front cover including a coin entry opening in registration with said guiding passageway and a coin returning slot opening in registration with said returning slot and said front cover being fixed relative to said base plate.

11. A coin selector according to claim 9, wherein the antenna support part includes a guiding passageway part and an upwards slanting surface part made from a nonmagnetic material.

12. A coin selector according to claim 9, wherein the antenna support part includes a part defining an upwardly slanting surface, slanted to face an upper section of said base plate, the part having a coin entry to said guiding passageway which is located at said upwards slanting surface and said antenna is located extending around said coin entry and recessed relative to said upwards slanting surface.

13. A smart card charging function and coin selector product provided by the process in accordance with claim 9, providing said guiding passageway for receiving coins and guiding said coins to said coin selection section.

14. A smart card charging function and coin selector product provided by the process in accordance with claim 13, providing said guiding passageway adjacent to a coin entry slot for receiving cards to be detected by said antenna.

15. A coin selector with a smart card charging function, the coin selector comprising:

a support structure;

a corn processing section connected to said support structure and supported thereby;

an antenna support part connected to said support part;

an antenna connected to said antenna support part, wherein said antenna support part supports said antenna; and an opening in said antenna support part for receiving cards and coins, said opening being arranged relative to said coin processing section to pass coins thereto, said antenna detecting cards placed in said opening.

* * * * *